(12) United States Patent
Powers et al.

(10) Patent No.: US 8,308,152 B2
(45) Date of Patent: Nov. 13, 2012

(54) METHOD AND SYSTEM FOR PRODUCING BOOKLETS

(75) Inventors: John Powers, Ontario, NY (US); Somi Ruwan Budhagoda Arachchige, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 715 days.

(21) Appl. No.: 12/419,092

(22) Filed: Apr. 6, 2009

(65) Prior Publication Data

US 2010/0252979 A1    Oct. 7, 2010

(51) Int. Cl.
B41F 13/54    (2006.01)
(52) U.S. Cl. ............................ 270/1.01; 270/17; 358/2.1
(58) Field of Classification Search ................. 270/1.01, 270/12, 17; 358/1.2, 1.5, 2.1
See application file for complete search history.

(56) References Cited

U.S. PATENT DOCUMENTS 6,894,804 B2 *    5/2005    Nguyen et al. ................. 358/1.2

OTHER PUBLICATIONS

Web Page, About com: Desktop Publishing, Jacci Howard Bear, "Calculating Creep Compensation," Oct. 12, 2006.
Web Page, About com: Desktop Publishing, Jacci Howard Bear, "Creep Allowance", Feb. 12, 2009.
Web Page, About com: Desktop Publishing, Jacci Howard Bear, "Gutter", Feb. 12, 2009.

* cited by examiner

Primary Examiner — Ren Yan
(74) Attorney, Agent, or Firm — Hoffmann & Baron, LLP

(57) ABSTRACT

A method and system of making a book formed of a plurality of booklets having a plurality of sheets including receiving a paper value from an input device which corresponds to a sheet thickness. A maximum number of sheets per booklet based on the paper value is determined. The minimum number of sheets which will contain all pages of the book pages and the least number of booklets required responsive to the maximum number of sheets required are determined. The number of sheets in each booklet is determined and is stored. The sheets are distributed among the number of booklets. The creep for each sheet based on the paper value is determined. An image transfer device is controlled responsive to the determination of the creep.

13 Claims, 2 Drawing Sheets

METHOD AND SYSTEM FOR PRODUCING BOOKLETS

BACKGROUND

1. Technical Field

The presently disclosed embodiments are directed to using a property of media for producing booklets bound to form books.

2. Brief Discussion of Related Art

A typical method of binding books includes forming a number of booklets which are then assembled together to form the final book. Each booklet is made up of a number of signature sheets folded in the middle and include printing on four sides of the folded sheet.

When forming books in this manner, the maximum booklet size must be determined. This determination is a function of the physical constraints of the machine itself and the thickness of the paper to be used in forming the booklets. A machine typically can only process a stack of sheets having a specific maximum thickness. With physical constraints of the machine being set, once the type of paper is selected, the machine operator stacks up the paper and measures its height. The maximum number of sheets of the particular paper that fit with in the capabilities of the machine determines the maximum booklet size.

One other calculation typically performed by printing machine operators is determining the amount of creep. As stacked sheets are folded, the edges of the sheets create a shingling effect with the edges of the innermost sheet extending farther than the edges of the outermost sheet. Therefore, the edges of the pages extend from the folded book more and more as they approach the center of the bound booklet. This difference between the edges of adjacent sheets is known as creep. The amount of creep depends on the thickness of the sheets and the number of sheets in the booklet.

Creep creates problems when binding books. The inside margin will be smaller for outer pages of the booklet than for the inner pages. If the margin is not adjusted the image near the crease on the outer pages may be obscured. In addition, in order to create a booklet with uniform edges, the edges are trimmed after the booklet is creased. When the edges are trimmed, the inner pages are narrower than the outer pages. If the images on the pages were set the same for each page, the image would appear to be misplaced on the pages after the trimming. For large amounts of creep, the image on some of the pages may be trimmed off. In order to correct this problem, printers adjust the image placement on the sheets.

Operators typically manually measure the total creep by using a test stack and determine the creep for each pages that the creep can be adjusted for. This is a time consuming process that must be performed for each job.

SUMMARY

According to aspects illustrated herein, there is provided a method of making a book formed of a plurality of booklets having a plurality of sheets including receiving a paper value from an input device which corresponds to a sheet thickness;

determining a maximum number of sheets per booklet based on the paper value;

determining the minimum number of sheets which will contain all pages of the book pages;

determining the least number of booklets required responsive to the maximum number of sheets required;

determining the number of sheets in each booklet, storing the results of the determination;

distributing the sheets among the number of booklets;

determining the creep for each sheet based on the paper value; and controlling an image transfer device responsive to the determination of the creep.

According to other aspects illustrated herein, there is provided a system for producing a book including sheets of media. The system includes an image transfer device for imprinting an image on a sheet of media. A processor is operably connected to the image transfer device. An input device is operably connected to the processor, and the input device receives information relating to a media weight of the sheets. The processor determines the maximum number of sheets per booklet. The processor determines the amount of creep responsive to the media weight.

According to further aspects illustrated herein, there is provided a computer-readable storage medium storing operational instructions that, when executed by a processor, cause the processor to perform a method including:

calculating a maximum number of sheets in a booklet based on paper weight, determining the number of booklets;

determining the actual number of sheets in each booklet; and determining the creep for each sheet based on the paper weight.

DETAILED DESCRIPTION

Books may be formed of a plurality of booklets which are bound together. Each booklet may be formed of a number of signature sheets having four images which constitute four pages of the book. A booklet maker as controlled by way of the process described herein determines the number of sheets per booklet so that the sheets are evenly distributed and also adjusts the placement of the image on the sheets to compensate for creep to obtain desirable margins.

As used herein "booklet" refers to a plurality of substrate media which is joined and folded.

As used herein "paper value" includes a physical property of the media used to form the booklets.

As used herein "creep" refers to a calculated or otherwise determined value based on the difference in length between the edges of adjacent stacked sheets of a folded booklet.

As used herein "sheets" refers to layers of substrate material such as paper, which may be folded to form a booklet.

As used herein "image transfer device" refers to a mechanism for imparting an image on a substrate media. An image transfer device may impart the image, for example, by way of electrostatic printing, offset printing, ink jet, or any method of transferring an image to a substrate media.

As used herein "processor" refers to a device or plurality of devices such as microprocessors, CPU's, computer, or other devices, firmware or software capable of executing an instruction set and/or performing calculations.

As used herein "input device" refers to device that feeds data into a processor such as a keyboard, keypad, mice, trackballs, touch screen or light pens.

As used herein "media weight" refers to a property of sheet media which is determined by the weight in pounds of a ream (500 sheets) of media cut into a standard size.

As used herein "paper weight" refers to a property of sheet of paper media which is determined by the weight in pounds of a ream (500 sheets) of paper cut into a standard size.

As used herein "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

Figure 1:
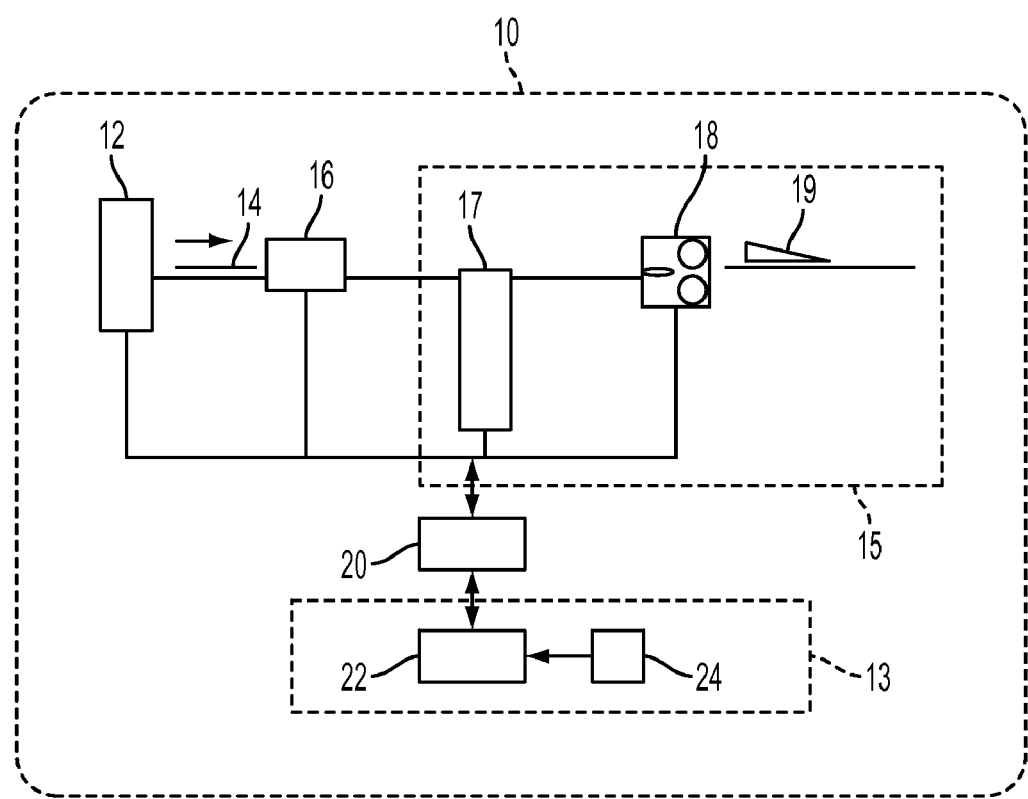
FIG. 1 is a schematic view of a booklet maker.

With reference to FIG. 1, a printing system 10 of a book binding device may include a sheet feeding device 12 where substrate media in the form of sheets 14, such as paper, are transported to an image transfer device 16. The image transfer device 16 imprints an image on the sheet. The image transfer device includes the ability to print the image on the sheet within predefined margins. These margins can be adjusted in order to compensate for creep. In a digital image transfer device, a digital front end (DFE) 13 processes information and controls the image and its placement on the sheet device. Printed sheets may then be transferred to a booklet maker 15 which includes a collator 17. When the requisite number of sheets to form a booklet is collected the pages may be joined together, such as by stapling, and then sent though a creasing device 18. The booklets 19 may then be bound together to form a book.

The printing system 10 may further include a controller 20 which is operatively connected to various components of the booklet maker including the sheet feeding device 12 and the collator 17. Therefore, the controller 20 can adjust the number of sheets per booklet as determined by a processor 22. Processor 22 which is operably connected to the controller 20 may include one or more microprocessors, hardware, firmware, software and memory. The processor 22 may calculate, for example, the number of sheets per booklet and calculate the creep. An input device 24, which may include a keypad, touch screen or the like, is operably connected to the processor 22 to permit a machine operator to input instructions or data for a particular job. The processor and input device may be part of the DFE 13.

When a book is to be constructed from a number of bound booklets, one parameter that is determined is the maximum number of sheets per booklet. A given book making machine, due to its physical constraints, will have a maximum thickness of sheets in a stack that it can properly accommodate and make into a booklet. This maximum thickness dimension is therefore a constant for the machine. With the limits of the machine being known, the other factor relevant to the maximum number of sheets that can be used to form a booklet is the type of media being used to form the booklet. Media, such as paper, is typically sized by its outer dimensions, e.g., 8½×11, and its weight. The media weight is a value that relates to the thickness of the media with higher media weights having greater thicknesses. With paper based media, paper weight is a parameter typically used to describe a property of the paper. The processor 22 uses the maximum thickness constant and the paper weight to determine the maximum number of sheets per booklet.

Paper weight is also used by the processor 22 to determine the amount of creep. The greater the thickness of the stack of sheets forming a booklet, the greater the amount of total creep. Since thickness of the stack is a function of the paper weight, the processor uses this property to determine and adjust for the creep.

Figure 2:
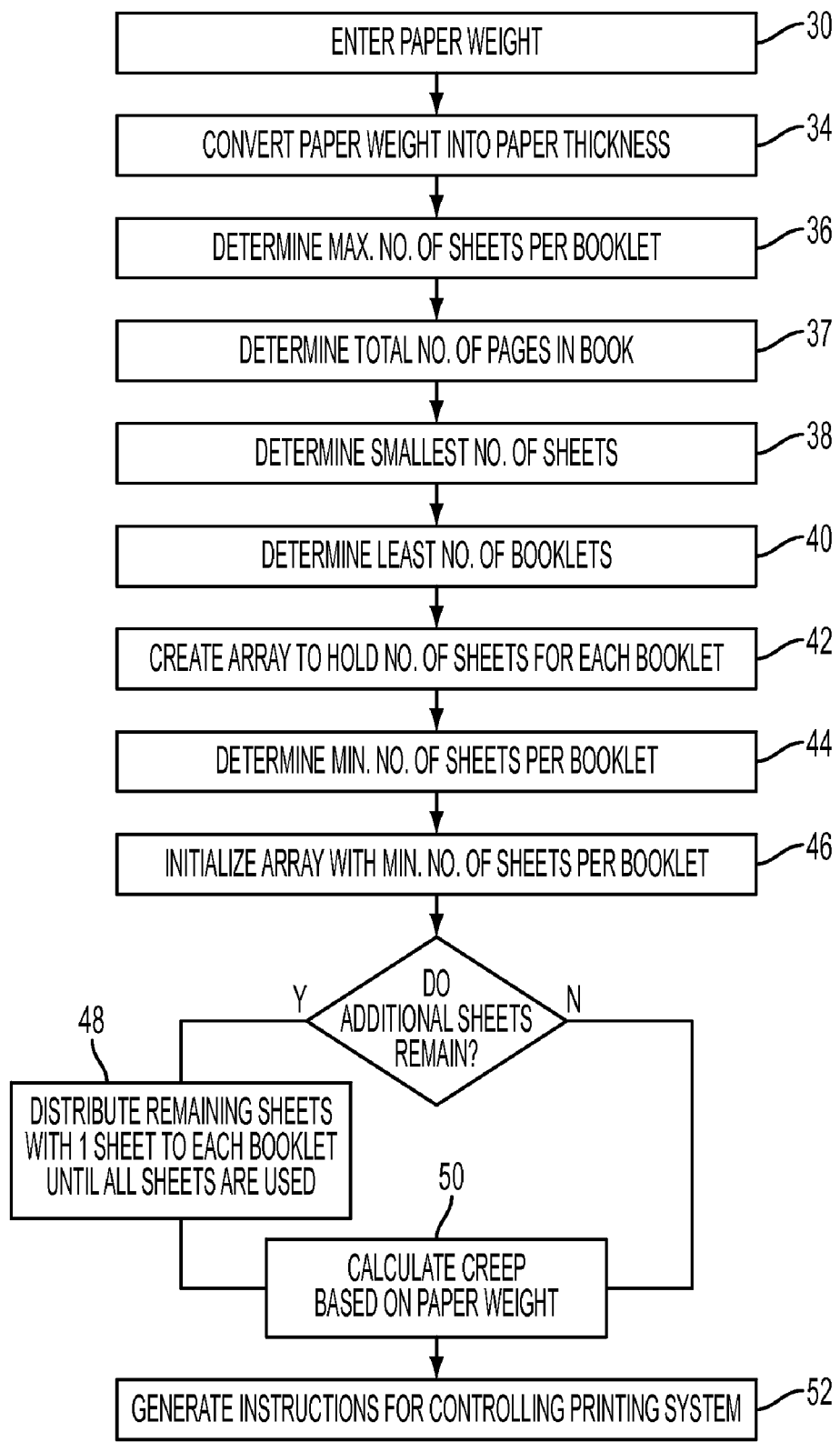
FIG. 2 is a flow diagram of a method of making a book including a plurality of booklets.

With reference to FIG. 2 the various steps of the method for controlling the booklet maker are shown. When an operator desires to print a book, they may enter the paper weight 30 for the book by way of the input device 24. The processor 22 receives this information and converts the paper weight to a sheet thickness value 34. The thickness dimension of standard paper weights may be stored in the processor's memory. The sheet thickness value is then operated on by the processor to determine the maximum number of sheets per booklet 36. This maximum number of sheets is determined in part by the maximum thickness of the stack of sheets the book making machine can handle. This machine limitation may be represented by a constant, CONST1. The maximum number of sheets per booklet value, MaxSheetsPerBooklet, is determined by the following equation:

$$\text{MaxSheetsPerBooklet} = \text{CONST1}/\text{Thickness Value}$$

A given book making machine, such as the finishing and binding modules thereof, may have restrictions other than thickness which limit the number of sheets in a booklet. In such a machine, the MaxSheetsPerBooklet would be limited by such a predetermined value.

The smallest number of sheets in the job which will contain all the pages in the book (SheetsInJob) is determined. In a booklet comprised of folded sheets, each sheet includes 4 pages, 2 on the front side and 2 on the back side. Such sheets are commonly referred to as signature sheets. The total number of pages (PagesInJob) is a value which may be determined by the processor 22 of the DFE based on the print job. When a file is transmitted from printing the DFE will convert the file into instructions to be carried out by the printing system 10. This process would include determining the total number of pages 37. The value SheetsInJob may be determined 38 by the processor employing the following equation:

$$\text{SheetsInJob} = (INT((\text{PagesInJob}-1)/4)) + 1$$

The processor then determines the least number of booklets required that will contain no more than the maximum number of sheets per booklet 40. This may be determined by the following equation:

$$\text{BookletsInJob} = INT((\text{SheetsInJob}-1)/\text{MaxSheetsPerBooklet}) + 1$$

An array is created to hold the number of sheets for each booklet 42. Then the minimum number of sheets per booklet is determined 44 by the following equation:

$$\text{SheetsMin} = INT(\text{SheetsInJob}/\text{BookletsInJob})$$

The array is then populated with the SheetsMin value for each booklet 46.

If the SheetsInJob/BookletsInJob equation does not result in a whole number, then all the sheets which make up the book cannot be distributed evenly across all the booklets, i.e., some booklets will have more pages than other booklets. Accordingly, after the sheets are evenly distributed, additional sheets remain. In this case, the number of remainder sheets is determined:

$$\text{RemainderSheets} = \text{SheetsInJob} \text{ MODULO } \text{BookletsInJob}.$$

The additional remainder sheets remain to be added to the array. One remaining sheet is distributed to each of the first booklets until all the remainder sheets are distributed 48.

For (X=0); X<RemainderSheets; X++)
a. Increment SheetsInSet (X)

Based on the above, the number of booklets and the number of sheets in each booklet is determined.

The paper weight is further used to determine the creep for each page. The greater the paper weight, the thicker the sheet stack of a booklet. The sheet stack thickness affects the amount of creep. The processor determines the amount of creep for each sheet based on the paper weight 50 and the number of sheets. The following formula may be used to determine the creep:

Creep=Thickness value*$pi/2$

The result from this equation provides the distance that each page's outside margin is to be adjusted.

With the number of pages for each booklet and the creep determined, the processor 22 can send the instructions to the various printing system components 52 including the collator and image transfer device so that each booklet will have the proper number of pages and the image can be placed on the sheets in the correct location with proper margins. In a digital print unit the processor communicates with the digital front end to have the image location adjusted to compensate for creep.

Accordingly, a printing machine operator need only enter the paper weight and the processor automatically determines the booklet size and the amount of creep.

It is contemplated that the various steps described above may be preformed in differing orders and the order described is not intended to be limiting.

The above method will now be described by way of example. If a print job is for a book of 350 pages and the paper weight is 90 the operator would input the paper weight information in the processor. If the maximum sheets for the machine is 15 for 90 weight paper, then the constant, CONST1, would be set so the MaxSheetsPerBooklet=15.90 weight paper has a thickness of 0.12 mm.

15=CONST1/0.12 mm

CONST1=1.8.

The CONST1 is a predefined value. If thinner paper is used the maximum number of sheets per booklet will increase and if the paper is thicker the number of sheets will decrease.

In the current example using 90 weight paper, MaxSheetsPerBooklet is 15

(1.8/0.12=15).

If the machine does not have any other limitation on number of sheets then the MaxSheetsPerBooklet will remain at 15.

The smallest number of sheets is then determined:

SheetsInJob=$INT$((350−1)/4)+1

SheetsInJob=88

The least number of booklets required is then calculated:

BookletsInJob=$INT$((88−1)/15)+1

BookletsInJob=6

The array is created consisting of 6 booklets and is populated with the number

The minimum sheets per booklet would be:

SheetsMin=$INT$(88/6)=14

14×6=84.

The array would be

|  | Booklet No. | | | | | |
| --- | --- | --- | --- | --- | --- | --- |
|  | 1 | 2 | 3 | 4 | 5 | 6 |
| No. of Pages | 14 | 14 | 14 | 14 | 14 | 14 |

The number of remainder sheets is then determined:

RemainderSheets=88 MODULO 6=4

Therefore, there are 4 extra sheets which would be distributed over the first 4 booklets. Accordingly, the first four booklets would have 15 sheets and the remaining 2 booklets would have 14 sheets.

|  | Booklet No. | | | | | |
| --- | --- | --- | --- | --- | --- | --- |
|  | 1 | 2 | 3 | 4 | 5 | 6 |
| No. of Pages | 15 | 15 | 15 | 15 | 14 | 14 |

The image would be adjusted to compensate for the creep using a formula based on the paper weight. The paper weight would be converted to a paper thickness value and used in the following equation:

Creep=Thickness value*$pi/2$ 0.12 mm*3.14/2=0.189 mm

The processor 22 would then provide instructions to the controller 20 which in turn would send signals to the booklet making machine components to create the booklets in accordance with the determined values.

In order to implement the methods described herein, dedicated hardware implementations, such as application specific integrated circuits, programmable logic arrays and other hardware devices, may be constructed. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by the processor 22. Further, in an exemplary, non-limited embodiment, implementations may include distributed processing, component/object distributed processing, and parallel processing. Alternatively, virtual computer system processing may be constructed to implement one or more of the methods or functionality as described herein.

The present application contemplates a computer-readable medium that includes instructions or receives and executes instructions responsive to a propagated signal.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a medium that is equivalent to a tangible storage medium. Accordingly, the application is considered to include any one or more of a computer-readable medium and other equivalents and successor media, in which data or instructions may be stored.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of making a book formed of a plurality of booklets having a plurality of sheets comprising:

receiving a paper value from an input device which corresponds to a sheet thickness;

determining with a processor a maximum number of sheets per booklet based on the paper value;

determining with the processor a minimum number of sheets which will contain all pages of the book;

determining with the processor a least number of booklets required responsive to the maximum number of sheets required;

determining with the processor a number of sheets in each booklet, storing the results of the determination;

distributing the sheets among the number of booklets;

determining with the processor the creep for each sheet based on the paper value; and controlling an image transfer device responsive to the determination of the creep.

2. The method of claim 1, wherein determining the maximum number of sheets per booklet is responsive to a predetermined constant, CONST1, wherein CONST1 is a predetermined value relating to a maximum thickness of the stack of sheets a book making machine can process.

3. The method of claim 2, wherein determining the maximum number of sheets per booklet includes using the formula:

CONST1/sheet thickness.

4. The method of claim 3, further including determining the total number of pages in the book (PagesInJob) and wherein determining the minimum number of sheets forming the book is calculated with the formula:

SheetsInJob=($INT$((PagesInJob−1)/4)+1.

5. The method of claim 4, wherein determining the least number of booklets required is calculated with the formula:

BookletsInJob=$INT$((SheetsInJob−1)/MaxSheetsPerBooklet)+1.

6. The method of claim 5, wherein determining the number of sheets in each booklet includes determining the minimum number of sheet, SheetsMin, is calculated with the formula:

SheetsMin=$INT$(SheetsInJob/BookletsInJob).

7. The method of claim 6, creating an array corresponding to the number of booklets and initializing the array with the minimum number of sheets.

8. The method of claim 7, further including determining the number of remainder sheets to be distributed.

9. The method of claim 8, further including distributing the remainder sheets with one sheet being added to each booklet until the remainder sheets are depleted.

10. The method of claim 1, further including controlling the image transfer device to adjust the margins of the image in response to the creep determination.

11. The method of claim 2, further including controlling a sheet feeding device to feed a number of sheets in response to a determination of the maximum number of sheets per booklet.

12. The method of claim 1, wherein determining the creep includes using the following formula:

sheet thickness*$pi$/2.

13. The method of claim 1, wherein the paper value is the sheet weight, and wherein the processor converts sheet weight to sheet thickness to determine the creep.

* * * * *